(12) United States Patent
DeRose et al.

(10) Patent No.: US 9,329,413 B1
(45) Date of Patent: May 3, 2016

(54) METHOD AND APPARATUS OF HIGHLY LINEAR OPTICAL MODULATION

(71) Applicant: Sandia Corporation, Albuquerque, NM (US)

(72) Inventors: Christopher DeRose, Albuquerque, NM (US); Michael R. Watts, Hingham, MA (US)

(73) Assignee: Sandia Corporation, Albuquerque, NM (US)

( * ) Notice: Subject to any disclaimer, the term of this patent is extended or adjusted under 35 U.S.C. 154(b) by 80 days.

(21) Appl. No.: 14/282,904

(22) Filed: May 20, 2014

Related U.S. Application Data

(60) Provisional application No. 61/825,442, filed on May 20, 2013.

(51) Int. Cl.
| | | |
|---|---|---|
| G02F 1/01 | (2006.01) | |
| G02F 1/015 | (2006.01) | |
| G02F 1/025 | (2006.01) | |
| G02F 1/225 | (2006.01) | |
| G02F 1/21 | (2006.01) | |

(52) U.S. Cl.
CPC .............. *G02F 1/0123* (2013.01); *G02F 1/015* (2013.01); *G02F 1/025* (2013.01); *G02F 1/2257* (2013.01); *G02F 2001/0151* (2013.01); *G02F 2001/212* (2013.01)

(58) Field of Classification Search
None
See application file for complete search history.

(56) References Cited

U.S. PATENT DOCUMENTS

| | | | | | |
|---|---|---|---|---|---|
| 5,002,353 | A | * | 3/1991 | Johnson | G02F 1/0327 385/3 |
| 5,015,053 | A | * | 5/1991 | Johnson | G02F 1/0327 385/2 |
| 5,230,028 | A | * | 7/1993 | Lin | G02F 1/3132 385/3 |
| 5,278,923 | A | * | 1/1994 | Nazarathy | G02F 1/225 385/1 |
| 5,309,532 | A | * | 5/1994 | Chang | G02F 1/3132 385/3 |
| 8,849,071 | B2 | * | 9/2014 | Kissa | G02F 1/225 385/3 |

OTHER PUBLICATIONS

DeRose, Christopher T., Douglas C. Trotter, William A. Zortman, and Michael R. Watts. "High speed travelling wave carrier depletion silicon Mach-Zehnder modulator," in *Optical Interconnects Conference, 2012 IEEE* (IEEE, 2012) 135-136.

* cited by examiner

*Primary Examiner* — John M Bedtelyon
(74) *Attorney, Agent, or Firm* — Martin I. Finston

(57) ABSTRACT

In a new optical intensity modulator, a nonlinear change in refractive index is used to balance the nonlinearities in the optical transfer function in a way that leads to highly linear optical intensity modulation.

23 Claims, 5 Drawing Sheets

METHOD AND APPARATUS OF HIGHLY LINEAR OPTICAL MODULATION

CROSS-REFERENCE TO RELATED APPLICATIONS

This application claims priority from U.S. Provisional Patent Application Ser. No. 61/825,442, filed May 20, 2013.

STATEMENT OF GOVERNMENT INTEREST

This invention was developed under Contract DE-AC04-94AL85000 between Sandia Corporation and the U.S. Department of Energy. The U.S. Government has certain rights in this invention.

FIELD OF THE INVENTION

The invention relates to photonic devices that perform modulation, switching, and filtering functions and the like through application of electro-refractive effects.

ART BACKGROUND

Conventional lithium niobate optical intensity modulators are widely used, not least because they have a relatively large optical bandwidth. The typical linearity of such a modulator is on the order of 122 dB in a 1-Hz bandwidth. There are specialized electro-absorption modulators with better linearity than lithium niobate modulators, but they generally suffer from a relatively narrow optical bandwidth. Thus, there remains a need for modulators that offer the combined advantages of high linearity and high optical bandwidth.

SUMMARY OF THE INVENTION

We have provided a new, highly linear carrier depletion optical modulator. The linearity of optical modulators, particularly optical intensity modulators, is a limiting factor in the dynamic range of radio signals sent over optical links. For a typical electro-optic material, the nonlinearity of the device is determined by the optical transfer function of the device. Here, we present a modulator which uses a nonlinear change in refractive index to balance the nonlinearities in the optical transfer function in a way that forms a highly linear optical intensity modulator or optical phase modulator.

The invention offers the potential to significantly improve the linearity of radio over optical links. By having a highly linear modulator, higher dynamic range signals can be sent and detected optically. This is an enabling factor for, e.g., high-performance analog optical systems such as optical analog to digital converters. The invention has applications in various fields including telecommunications, data communications, and RF photonics.

Previous efforts to make electro-optic modulators more linear have relied on engineering of the junction optical transfer function. By contrast, our new approach demands only judicious engineering of the optical mode overlap with the p-n junction. Applications of our new approach can enable operation over a wider range of conditions with less susceptibility to fabrication imperfections.

An exemplary embodiment of our invention in one aspect is a method for operating an optical modulator of the kind that has a bias voltage and a bias phase as operational parameters. According to our method, an operating point is selected that consists of a bias voltage paired with a bias phase, wherein the selection is made from a parameter space of paired bias voltages and bias phases, and wherein the selection is more particularly made from a region of the parameter space that is designated a low-distortion region. The modulator is configured to operate at the selected operating point by setting a base value of the bias voltage and setting at least one other parameter independent of the bias voltage. Examples of such independent parameters are temperature and wavelength of the modulated optical beam.

An exemplary embodiment of our invention in a second aspect is an optical modulation apparatus. The apparatus includes at least one waveguiding path for an optical beam, one or more p-n junction regions traversed by the waveguiding path, and an electrode arrangement for applying bias voltage across one or more of the p-n junction regions. The apparatus further includes a control unit. The control unit is configured to select an operating point for the apparatus from a parameter space of paired bias voltages and bias phases, wherein the selection is made from a region of the parameter space that is designated a low-distortion region.

BRIEF DESCRIPTION OF THE DRAWINGS

FIG. 1a provides a contour plot, obtained from numerical modeling, of the normalized optical intensity of the fundamental mode of a silicon waveguide containing a p-n junction. Also indicated by a pair of broken lines is the depletion region that forms at zero bias. FIG. 1b is a similar contour plot, in which an inner pair of broken lines again indicates the depletion region at zero bias, and an outer pair of broken lines indicates a depletion region whose width has been shifted by an amount $\Delta h$ by application of reverse bias.

DETAILED DESCRIPTION

The magnitude of the electro-optic coefficient for crystals exhibiting the Pockels effect is determined by crystal structure. Because silicon has a centrosymmetric crystalline structure, it does not exhibit the Pockels effect.

However, the effective index of refraction (hereinafter, "index") of a silicon optical waveguide can alternatively be modulated by manipulating carrier concentrations by application of a bias voltage. In such an approach, the waveguide, or a portion of it, is made coextensive with at least a portion of a p-n junction. A reverse bias applied to the p-n junction creates a condition of carrier depletion that changes the index.

A further advantage of such an approach is that the magnitude of the effective index change as a function of the bias voltage for the silicon waveguide is not determined by crystal structure. Instead, it can be engineered by control of dopant densities, implant energies, and waveguide design.

According to perturbation theory, the change in effective index of a waveguide, $\Delta n_{eff}$, due to the shift of a boundary by $\Delta h$ is given by Eq. (1).

$$\Delta n_{eff} = -n_g \frac{\int dx\, dy (\Delta \epsilon_{12} |E_\|\|^2 + \Delta(\epsilon_{12}^{-1})|D_\perp|^2) * \Delta h}{\langle E|\epsilon|E\rangle} \quad (1)$$

where $|E\rangle$ is the spatial distribution of the electric field of the optical mode, $n_g$ is the group index of the waveguide mode, $E_\|$ is the value of the electric field parallel to the boundary taken at the boundary, $\Delta\epsilon_{12}$ is the difference in dielectric constant across the boundary, $D_\perp$ is value of the electric displacement field normal to the boundary taken at the boundary, and $\Delta h$ is the distance the boundary shifts. Since this line integral depends only upon waveguide geometry and p-n junction shape, it represents a constant for a given device geometry. Therefore Eq. (1) can be written in a simplified form as:

$$\Delta n_{eff} = r^* \Delta h(V) \quad (2)$$

where r is an effective electro-optic coefficient, defined by Eq. (1). Within a p-n junction, a depletion region exists whose width is given by $$w = \sqrt{\frac{2\epsilon\epsilon_0}{q} \frac{N_A + N_D}{N_A * N_D} (V + \phi_B)} \quad (3)$$

where $\epsilon$ is the material dielectric constant, $\epsilon_0$ is the permittivity of free space, q is the electron charge, $N_A$ is the acceptor concentration, $N_D$ is the donor concentration, V is the applied reverse bias voltage and $\phi_B$ is the built-in potential. Combining Eqs. (2) and (3) and absorbing the constants into the r-coefficient, we see that the perturbation in the effective index due to modulating the width of a depletion region in a p-n junction is given by Eq. (4).

$$\Delta n_{eff}(V) = r^* (\sqrt{(V+\phi_B)} - \sqrt{\phi_B}) \quad (4)$$

The quantity r in Eq. 4 is not simply a material parameter; rather, it depends on waveguide design, dopant densities and the location and shape of the p-n junction.

Figure 1:
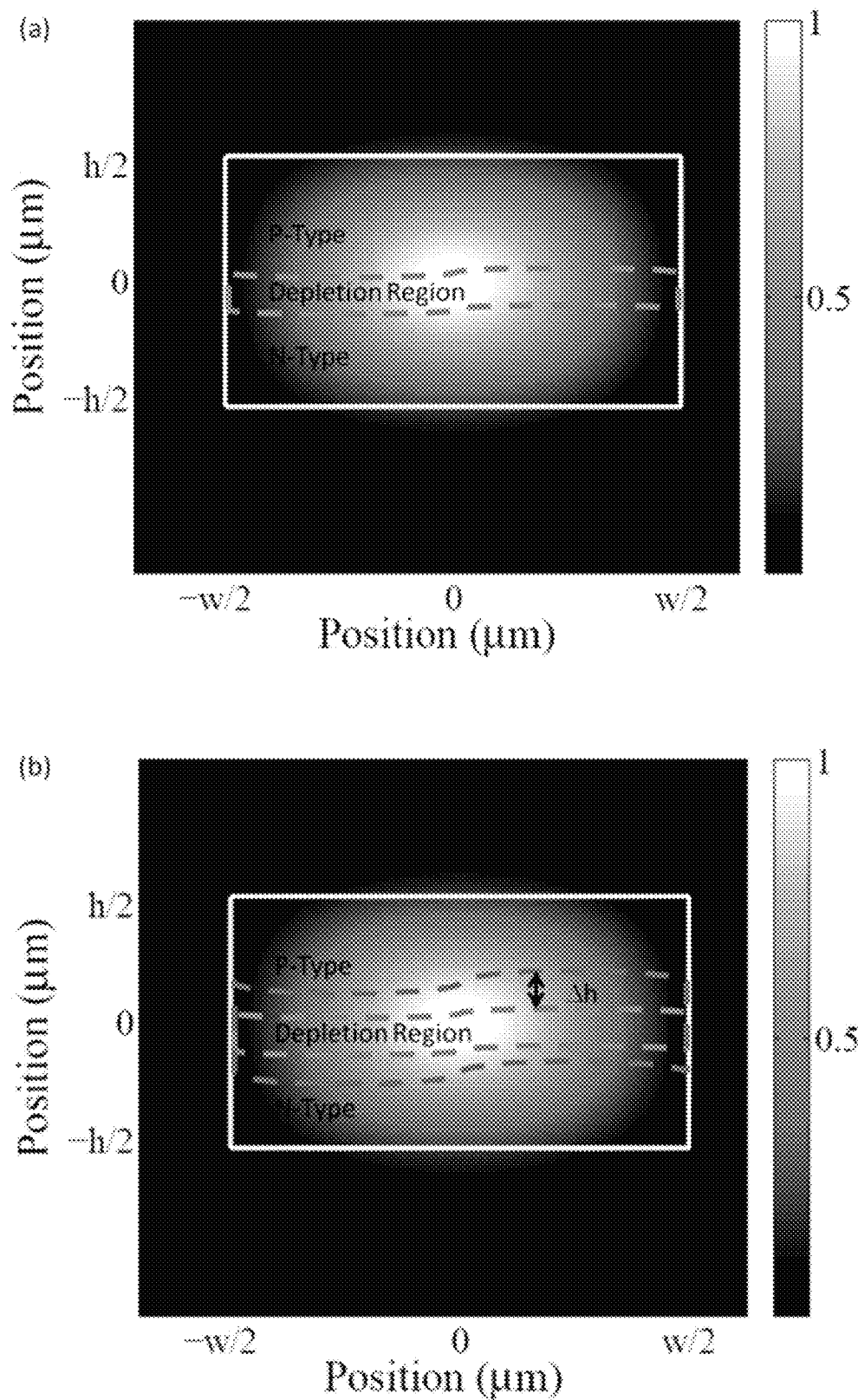
FIGS. 1a and 1b illustrate the effect of reverse bias on the operation of a silicon carrier-depletion modulator.

FIGS. 1a and 1b provide an illustration of carrier-depletion modulation. More specifically, FIG. 1a provides a graphical illustration, obtained from numerical modeling, of the normalized optical intensity of the fundamental mode of a silicon waveguide containing a p-n junction, and of the depletion region that forms at zero bias. FIG. 1b shows that after applying a reverse bias, the width of the depletion region is shifted by an amount $\Delta h$.

There is a striking difference between the form of Eq. (4) and the effective index shift for materials which exhibit an electro-optic (Pockels) coefficient. Inspection of Eq. (4) will show that the index shift caused by carrier-depletion modulation is effectively proportional to the square root of the applied voltage. Electro-optic materials, on the other hand, exhibit a shift that is directly proportional to the applied voltage. As will be explained below, this fact is central in explaining why carrier depletion modulators can produce highly linear intensity modulation, whereas standard electro-optic modulators do not.

We will now explain how the functional form for the effective index as a function of voltage as described by Eq. (4) can give rise to extraordinarily linear optical intensity modulators. Consider a Mach-Zehnder modulator, whose optical intensity transfer function as a function of applied RF voltage, $I(V_{RF})$, is given by a raised cosine:

$$I(V_{RF}) = I_0 * \frac{1 + \cos\left(\frac{2\pi}{\lambda} n_{eff}(V_{RF}) * L + \phi_0\right)}{2}, \quad (5)$$

where L is the active length of the modulator, $\phi_0$ is the bias phase, and $V_{RF}$ is the RF modulating voltage. The effective index $n_{eff}$ is shown explicitly as functionally dependent on the RF modulating voltage. Note that this intensity modulation is the result of combining a phase modulator with a reference waveguide interferometrically.

Eq. (5) can be written as a Taylor series expansion to clarify the sources of intermodulation distortion:

$$I(V) = I(V_0) + \frac{\partial I}{\partial n}\frac{\partial n}{\partial V} * V_{RF} + \frac{1}{2}\left\{\frac{\partial^2 I}{\partial n^2}\left(\frac{\partial n}{\partial V}\right)^2 + \frac{\partial I}{\partial n}\frac{\partial^2 n}{\partial V^2}\right\} * V_{RF}^2 + \quad (6)$$

$$\frac{1}{6}\left\{\frac{\partial^3 I}{\partial n^3}\left(\frac{\partial n}{\partial V}\right)^3 + 3 * \frac{\partial^2 I}{\partial n^2}\frac{\partial n}{\partial V}\frac{\partial^2 n}{\partial V^2} + \frac{\partial I}{\partial n}\frac{\partial^3 n}{\partial V^3}\right\} * V_{RF}^3 + \ldots$$

The first-order term in the Taylor series expansion is descriptive of idealized operation, because it is directly proportional to the input modulating RF voltage. All of the higher-order terms contribute undesirable distortion.

In general, distortion terms which are proportional to even powers of $V_{RF}$, i.e. to terms of the form $(V_{RF})^{2n}$ where n is an integer, are composed of frequencies that are even multiples of the modulation frequency $\omega_{RF}$. Those frequencies are out of band for suboctave RF systems and hence can be removed with filtering in either the optical or electrical domain.

It is significant in this regard that linear electro-optic materials have an effective index shift that is proportional to the applied voltage. In other words, for x>1, all derivatives $$\frac{\partial^x n}{\partial V^x}$$

in such materials (if perfectly linear) are identically zero. On inspection of Eq. (6), it will be seen that if all higher-order derivatives of n are zero, it follows that the third-order intermodulation (IMD3) term in the Taylor series, i.e. the term proportional to $V_{RF}^3$, cannot be canceled without forcing $$\frac{\partial^3 I}{\partial n^3}$$

to be zero.

However, because of the cosine dependence that is evident in Eq. (5), the first and third derivatives $$\frac{\partial I}{\partial n} \text{ and } \frac{\partial^3 I}{\partial n^3}$$

of the intensity transfer function of a Mach-Zehnder modulator (MZM) are proportional to each other. In a linear electro-optic material, this implies that canceling the third-order intermodulation distortion (IMD3) to zero would also, undesirably, force the first-order term to zero.

In a carrier-depletion modulator, on the other hand, the higher-order derivatives $$\frac{\partial^x n}{\partial V^x}$$

are not identically zero. Hence if a bias phase and/or a bias voltage can be found that satisfies the condition, $$\frac{\partial^3 I}{\partial n^3}\left(\frac{\partial n}{\partial V}\right)^3 + 3 * \frac{\partial^2 I}{\partial n^2}\frac{\partial n}{\partial V}\frac{\partial^2 n}{\partial V^2} + \frac{\partial I}{\partial n}\frac{\partial^3 n}{\partial V^3} = 0, \quad (7)$$

it is possible to completely suppress the IMD3 for a simple carrier depletion Mach-Zehnder modulator.

In fact, there is a continuum of (bias phase, bias voltage) pairs that satisfy this condition. As a consequence, a carrier-depletion Mach-Zehnder modulator can be designed in such a way that it is limited by fifth-order, and not by lower-order, intermodulation distortion.

Figure 2A:
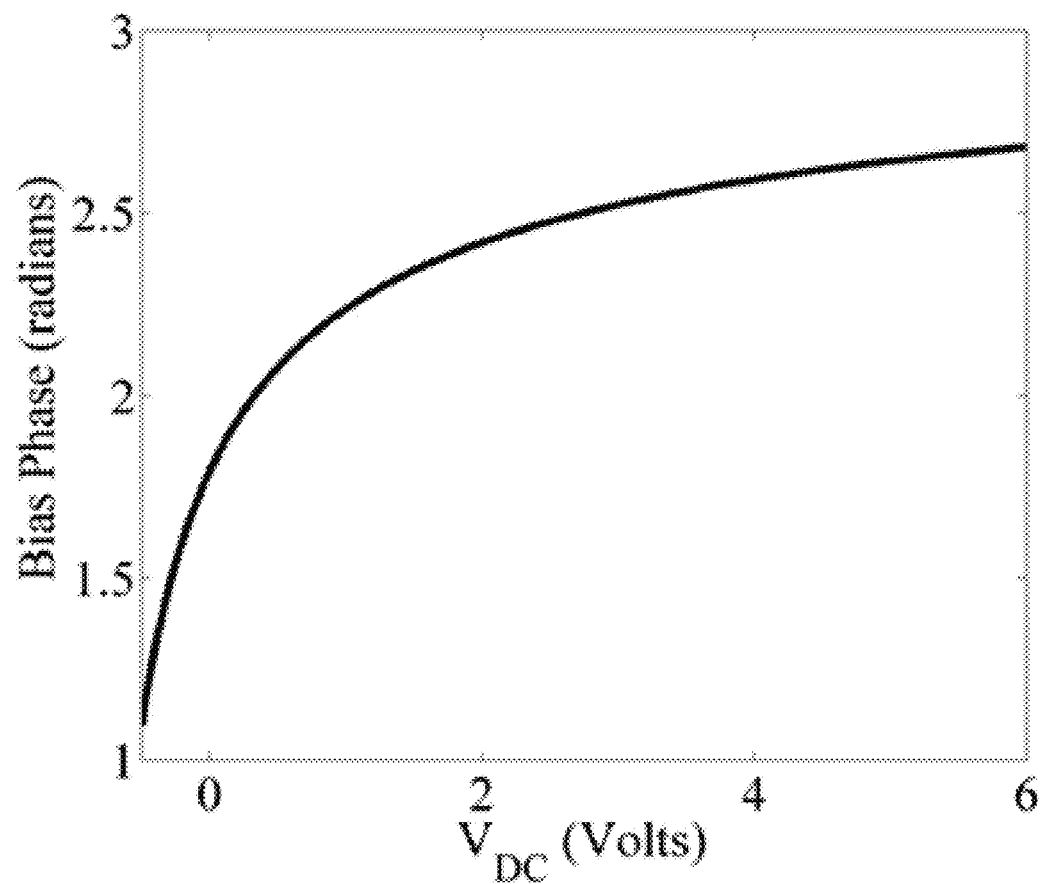
FIG. 2a provides a plot, derived from numerical simulations, of bias phase versus bias voltage. The plotted bias phase is the bias phase required to completely suppress IMD3 distortion in a silicon carrier-depletion modulator of a particular, exemplary design that has been modeled.

In FIG. 2a, we have provided an illustrative plot derived from numerical simulations of a device whose operation is based on a silicon p-n junction. In the figure, we have plotted the bias phase required to completely suppress the IMD3 distortion for each of a continuous range of reverse bias voltages.

It should be noted in this regard that in an optical modulator, the bias phase and the bias voltage can be independently controlled. For example, the bias phase in an MZM is the phase difference between the two optical paths corresponding to the two interferometer arms of the MZM. This phase difference may be controlled through, e.g., the thermo-optic effect, i.e. the thermal modulation of the refractive index, by employing a heater that changes the temperature of one arm relative to the other. In other examples, the bias phase may be controlled through chromatic dispersion by varying the wavelength of the modulated light. The bias voltage, on the other hand, is the voltage applied to the modulator p-n junction and as such is directly controllable.

In an exemplary implementation of the principles described here, a pair of values consisting of a bias voltage and a bias phase is selected, thus defining an operating point for a given modulator. To provide operation with low distortion, the operating point is selected from the points on or near a characteristic curve for the modulator that is similar to the curve of FIG. 2a but of course particular to the given modulator.

In analog operation, for example, the selected value of the bias voltage provides a fixed dc offset value, and the bias voltage is oscillated about that dc value to modulate an input light beam. For phase modulation, this procedure may be performed in a single modulation element. For amplitude modulation, this procedure may be performed, e.g., in one or both interferometer arms of an MZI. For example, it may be performed using a pair of complementarily driven modulation elements situated in respective arms of the MZI.

As will be understood by those skilled in the art, the selection of an operating point might involve a tradeoff between modulation depth and distortion rejection. That is, the optical power transfer function of, e.g., an MZI amplitude modulator has a shape that is, roughly speaking, proportional to a squared sinusoidal function of the bias phase. For purposes of illustration, we assume here that the transfer function is proportional to $\cos^2\theta$, where $\theta$ is the bias phase. In that simplified example, the greatest variation in the amount of extinction obtainable by oscillating the bias voltage will be achieved when the dc offset corresponds to a bias phase of $\pm 45°$, $\pm 135°$, etc., or in other words, $\pm 0.785$ radians, $\pm 2.356$ radians, etc.

It will be evident from the above example that the bias-phase setting that provides the greatest extinction ratio will not necessarily be optimal. That is, the bias voltage with which it is paired to define a low-distortion operating point might be non-optimal for extraneous reasons. Moreover, as will be better understood by reference to FIG. 2b and the following discussion, the operating point defined by the bias-phase setting that provides the greatest extinction ratio will generally differ from the operating point that achieves the least possible distortion. Hence, it will generally be desirable to balance several factors in choosing the best operating point for a given application.

Figure 2B:
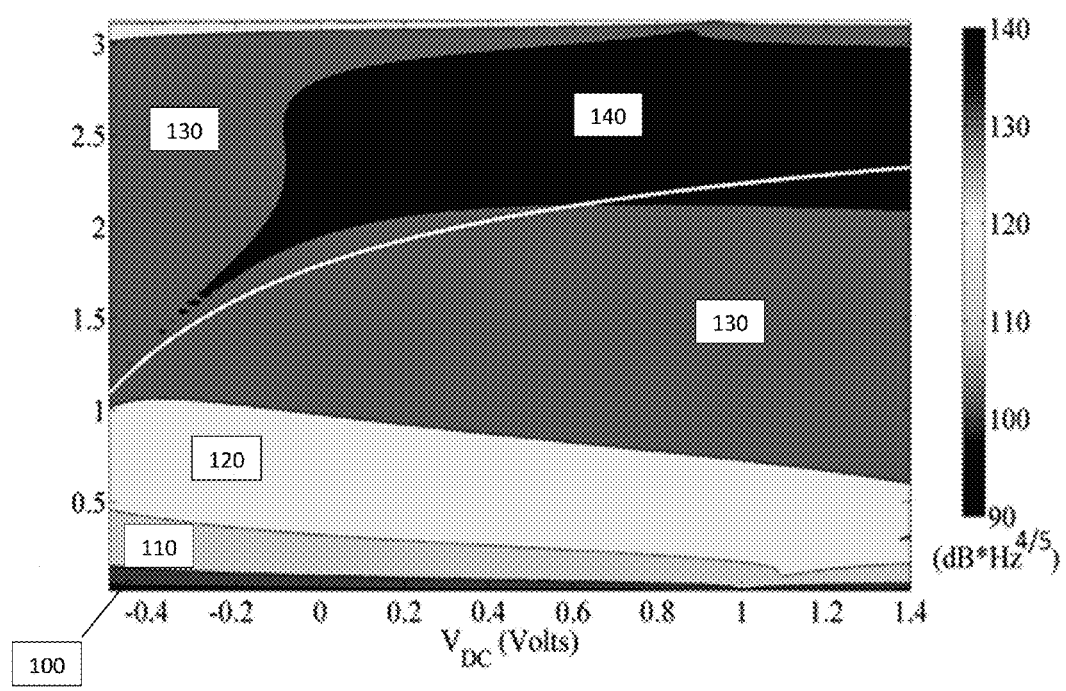
FIG. 2b provides a contour plot, derived from numerical simulations, of the spurious-free dynamic range (SFDR) of the modulator of FIG. 2a as a function of bias voltage and bias phase. The plot of FIG. 2a is superposed on the contour plot of FIG. 2b as adjusted for the difference in scale between the two figures.

Turning now to FIG. 2b, it will be seen that we have there provided a contour plot that, like FIG. 2a, was derived from numerical simulations. Plotted in FIG. 2b is the spurious-free dynamic range (SFDR) of the MZM of FIG. 2a as a function of bias voltage and bias phase. (The plot of FIG. 2a is superposed on the contour plot with a change in shape due to the differences in scale between the two figures.) The SFDR is defined relative to the fifth-order distortion. It will be seen on inspection of the figure that for a bias phase of about 2 radians with a reverse bias voltage of 1.2 V, a dynamic range of 140 dB/Hz$^{4/5}$ is theoretically achievable.

Analyses similar to that discussed above can be performed, with similar indications for the suppression of IMD3, for alternative types of silicon carrier depletion modulators, such as micro-disk and micro-ring resonator modulators. In such devices, for example, the waveguiding path that traverses one or more p-n junction regions is provided by the optical mode-confining structure of the resonator.

Accordingly, it should be understood that the invention is not limited in scope to Mach-Zehnder modulators, but rather encompasses silicon optical modulators of all designs that can be adapted for carrier-depletion operation. It should also be understood that although the illustrative Mach-Zehnder modulator described here includes a respective modulator element in each of the interferometer arms, alternative arrangements may omit the modulator element from one arm.

Figure 3:
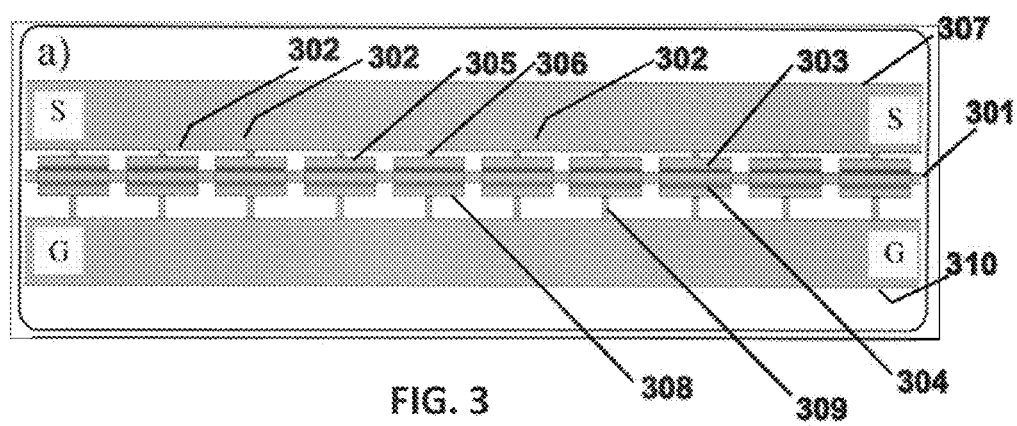
FIG. 3 provides a schematic top-down plan view of an illustrative waveguiding structure that could, for example, be incorporated in an arm of an MZM. The structure is adapted for carrier-depletion operation.

FIG. 3 provides a schematic top-down plan view of a waveguiding structure that could, for example, be incorporated in an arm of an MZM. The structure is adapted for carrier-depletion operation. As seen in the figure, waveguide 301 of intrinsic silicon passes through a sequence of diode elements 302. In each diode element, an n-type silicon region 303 adjoins one side of the waveguide, and a symmetrically placed p-type silicon region 304 adjoins the waveguide on the opposite side, so that a p-i-n junction including the intervening portion of the waveguide is formed. Contacts 305 and traces 306 connect the respective n-type regions to the signal-level conductor 307. Contacts 308 and traces 309 connect the respective p-type regions to the ground-level conductor 310, which is paired with conductor 307 to form a transmission line. Devices of this kind are described, for example, in DeRose, Christopher T., Douglas C. Trotter, William A. Zortman, and Michael R. Watts. "High speed travelling wave carrier depletion silicon Mach-Zehnder modulator," in *Optical Interconnects Conference, 2012 IEEE* (IEEE, 2012) 135-136, the entirety of which is hereby incorporated herein by reference.

Figure 4:
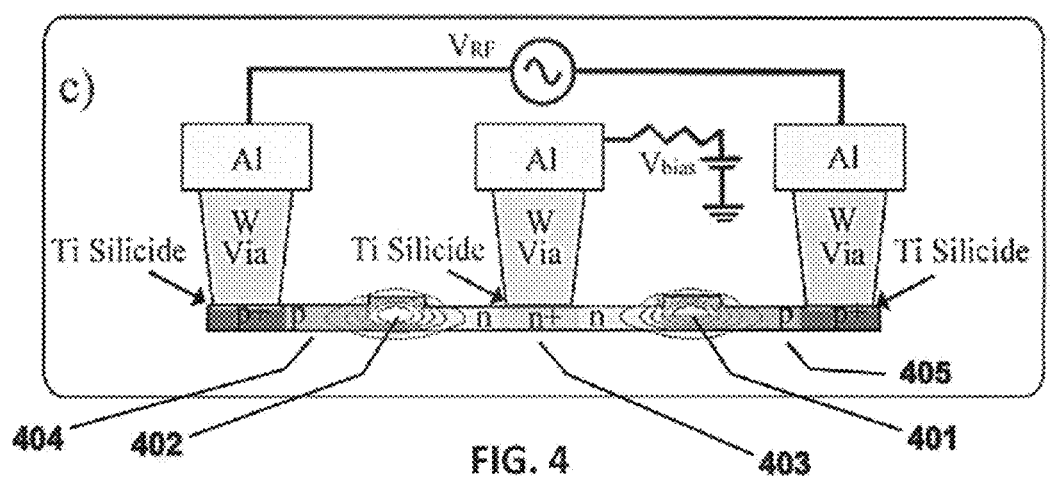
FIG. 4 provides a schematic cross section, in end view, of a portion of an MZM that is adapted for carrier-depletion operation.

FIG. 4 provides a schematic cross section, in end view, of a portion of an MZM that is adapted for carrier-depletion operation. As seen in the figure, two silicon waveguides 401 and 402 are provided. Interposed between the waveguides is an n-type region 403. Adjoining the outer sides of the waveguides are respective p-type regions 404, 405. The RF modulation signal $V_{RF}$ is applied in a push-pull arrangement between regions 404 and 405 while region 403 is held at a specified bias relative to ground. Those skilled in the art will recognize that such a driving arrangement is exemplary, and that other arrangements may readily be substituted.

Figure 5:
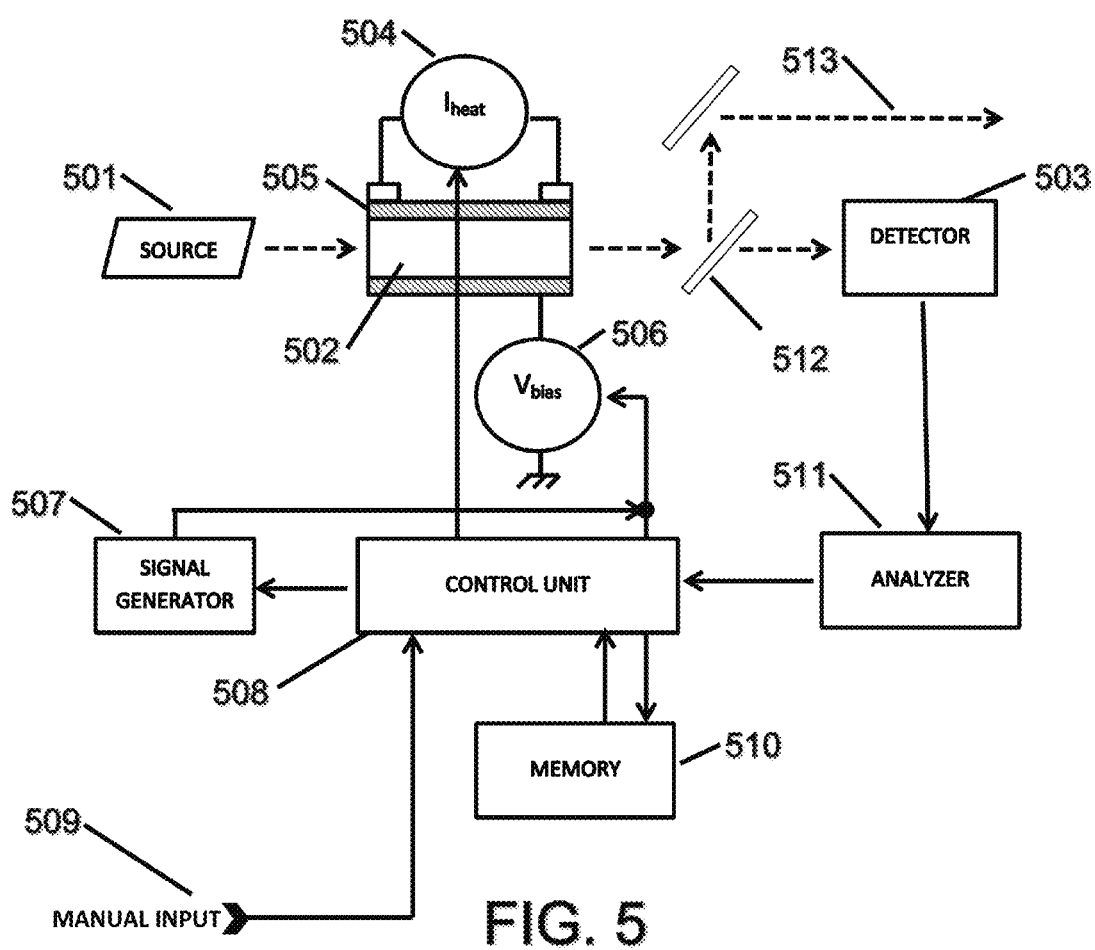
FIG. 5 provides a schematic block diagram of an optical modulator system, according to an embodiment of the present invention, in which a feedback loop enables the system to seek an optimal combination of bias voltage and bias phase.

FIG. 5 provides a schematic block diagram of a system in which the optical beam from source 501 passes through modulator waveguiding element 502 and in which a portion of the beam is subsequently detected in detector 503. The modulator includes a source of heating current 504 that flows through resistive heating element 505. Voltage source 506 applies a bias voltage across the waveguiding element. The waveguiding element traverses a p-n junction region that is not explicitly shown in the figure.

Signal generator 507 provides the signal that drives the time-varying component of the bias voltage and thereby modulates the optical beam. Control unit 508 sets the heating current and/or the bias voltage, and it may have additional functions as will be explained below.

In one scenario, for example, the operator manually inputs the dc component of the bias voltage at port 509, and the controller responds by automatically selecting a corresponding value of the modulator temperature (or equivalently, of the heater current). The selection of a corresponding temperature may be performed with reference to a distortion-minimizing curve in parameter space such as the curve of FIG. 2*a*. For example, a look-up table or other computer-readable or electronically readable representation of such a curve may be stored in memory 510 and accessed when needed by control unit 508.

Alternatively, the operator might e.g. manually input a desired value of the modulator temperature, to which the control unit would respond with an automatic selection of a corresponding dc value of the bias voltage.

In some possible implementations, a feedback loop is used to optimize the parameter settings. In one illustrative scenario, for example, control unit 508 directs signal generator 507 to drive the modulator with a test waveform designed to provide a useful indication of harmonic distortion. The resulting output from detector 503 is directed to analyzer 511, which computes a measurement of the amount of distortion that is present. The distortion measurement is fed back as an error signal to control unit 508, which in response varies the operational parameters according to an algorithm designed to seek an operating point that minimizes the error.

With further reference to FIG. 5, it will be seen that the detected portion of the output optical beam from the modulator is transmitted by partially reflecting mirror 512, whereas a main portion 513 of the beam is directed downstream for transmission or further processing. It will be understood that the arrangement that is depicted is merely exemplary and that numerous alternative arrangements are possible without departing materially from the principles described here.

What is claimed:

1. A method for operating an optical modulator of the kind that has a bias voltage and a bias phase as operational parameters, comprising:
   selecting an operating point that consists of a bias voltage paired with a bias phase, wherein the selection is made from a parameter space of paired bias voltages and bias phases, and wherein the selection is more particularly made from a region of the parameter space that is designated a low-distortion region;
   configuring the modulator to operate at the selected operating point by setting a base value of the bias voltage and setting at least one other parameter independent of the bias voltage; and
   operating the optical modulator according to the selected operating point by transmitting at least part of an optical beam on a waveguiding path and applying the bias voltage across one or more p-n junctions that traverse the waveguiding path.

2. The method of claim 1, wherein the bias-voltage-independent parameter is temperature.

3. The method of claim 1, wherein the bias-voltage-independent parameter is wavelength of a modulated optical beam.

4. The method of claim 1, further varying the bias voltage about the base value so as to modulate the optical beam.

5. The method of claim 1, wherein the optical beam is split into two beams that traverse respective paths through the modulator and that are recombined when exiting the modulator, and wherein at least one of the beams traverses at least one p-n junction region.

6. The method of claim 1, wherein the designated low-distortion region of the operational parameter space is designated as a region where third-order intermodulation distortion is suppressed.

7. The method of claim 1, wherein the designated low-distortion region of the operational parameter space is a curve in said space, and the operating point is selected, at least in part, by referring to an accessible representation of the curve.

8. The method of claim 7, wherein the operating point that consists of a bias voltage paired with a bias phase is selected by manually setting the bias voltage whereby a point on the curve is defined, and wherein the bias phase is automatically determined from the defined point on the curve.

9. The method of claim 7, wherein the operating point that consists of a bias voltage paired with a bias phase is selected by manually setting the bias phase whereby a point on the curve is defined, and wherein the bias voltage is automatically determined from the defined point on the curve.

10. The method of claim 7, wherein the accessible representation of the curve is a look-up table.

11. The method of claim 1, wherein the operating point that consists of a bias voltage paired with a bias phase is selected, at least in part, by varying the bias phase and bias voltage to minimize an error signal.

12. Optical modulation apparatus, comprising:
   at least one waveguiding path for an optical beam;
   one or more p-n junction regions traversed by the waveguiding path;
   an electrode arrangement for applying bias voltage across one or more said p-n junction regions; and
   a control unit configured to select an operating point for the apparatus from a parameter space of paired bias voltages and bias phases, wherein the selection is made from a region of the parameter space that is designated a low-distortion region.

13. The apparatus of claim 12, further comprising a heating element effective to vary a temperature in the waveguiding path, and wherein the control unit is configured to set the temperature according to a selected operating point.

14. The apparatus of claim 12, wherein the control unit is configured to respond to a manually designated bias voltage by selecting a corresponding bias phase.

15. The apparatus of claim 14, wherein, according to the selected bias phase, the control unit is configured to indicate a value of at least one other parameter independent of the bias voltage.

16. The apparatus of claim 15, wherein the bias-voltage-independent parameter is temperature.

17. The apparatus of claim 15, wherein the bias-voltage-independent parameter is wavelength of a modulated optical beam.

18. The apparatus of claim 12, wherein the designated low-distortion region of the operational parameter space is designated as a region where third-order intermodulation distortion is suppressed.

19. The apparatus of claim 12, further comprising a tangible medium in which is embodied a representation of a curve in the operational parameter space, and wherein the control unit is configured to select an operating point from said curve.

20. The apparatus of claim 19, wherein the curve representation is embodied as a look-up table stored in a computer-readable memory.

21. The apparatus of claim 12, further comprising a feedback circuit configured to generate an error signal representative of intermodulation distortion, wherein the error signal is fed back to the control unit, and wherein the control unit is configured to vary the operating point in a search for an operating point that minimizes the error signal.

22. The apparatus of claim 12, wherein the apparatus comprises a Mach-Zehnder modulator having two interferometer arms, a respective said waveguiding path is defined in each of said arms, and at least one of the two waveguiding paths traverses one or more of said p-n junction regions.

23. The apparatus of claim 12, wherein the apparatus comprises a micro-disk or micro-ring resonator, and the waveguiding path is defined within said resonator.

* * * * *